UNITED STATES PATENT OFFICE 2,394,915

COMPOSITION OF MATTER

Franklin D. Jones, Llanerch, Pa., assignor to American Chemical Paint Company, Ambler, Pa., a corporation of Delaware No Drawing. Application February 14, 1941, Serial No. 378,975

3 Claims. (Cl. 260—454)

The invention of the present application relates to compositions of matter. More particularly stated, the invention has reference to 1-naphthyl methyl thiocyanate and its isomer, 1-naphthyl methyl isothiocyanate.

1-naphthyl methyl thiocyanate, which, as far as I have been able to ascertain, is a new chemical individual, has the following structural formula:

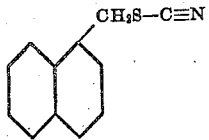

Its isomer, which is also a new compound, has the following structural formula:

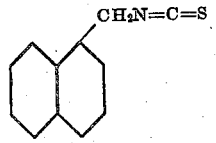

1-naphthyl methyl thiocyanate may be readily prepared in the following manner:

Alpha naphthyl methyl chloride and an alkali thiocyanate, such as potassium, sodium or ammonium thiocyanate, in molecular proportions, are mixed with three to four times their volume of an alcohol, such as methyl, ethyl or isopropyl alcohol, and refluxed for about an hour. During the reaction, the alkali chloride salt separates. At the end of the reaction, the hot mixture is poured into four times its volume of cold water, thereby dissolving the salt and precipitating solid naphthyl methyl thiocyanate. The product is washed several times with hot water, and finally is poured into hot methanol for crystallization. The yield of 1-naphthyl methyl thiocyanate is almost quantitative (over 90%).

The foregoing method can be carried out with either pure or crude materials. If crude materials are used, the resulting product has to be recrystallized to obtain pure naphthyl methyl thiocyanate. Pure 1-naphthyl methyl thiocyanate is a white crystalline solid having a melting point of 91 to 91.5° C.

1-naphthyl methyl isothiocyanate may be readily obtained in a yield from 30 to 50% by heating 1-naphthyl methyl thiocyanate to at least 170° C. for about an hour. The isothiocyanate can be separated from the unreacted thiocyanate by fractional distillation under a vacuum. A variation consists in treating the mixture of thiocyanate and isothiocyanate with methanol, which removes the thiocyanate, and then extracting the isothiocyanate from the tarry residue with ether.

1-naphthyl methyl isothiocyanate, unlike its isomer, is a yellowish mustard oil, which boils at 165° to 170° C. at 2 to 3 millimeters pressure. It has a disagreeable odor, which is not as offensive as the odors of certain other mustard oils. 1-naphthyl methyl thiocyanate has the decided advantage that it has no appreciable odor.

Both 1-naphthyl methyl thiocyanate and its isomer are very effective as insecticides and fungicides when used in the form of solutions or emulsions, or when applied as a fine spray with or without a solvent or dispersing agent. They are particularly deadly to flies, and aphis, when used as contact insecticides. The thiocyanate may be dissolved in methyl, ethyl or isopropyl alcohol, and the isothiocyanate may be dissolved in "Cellosolve," ethyl ether, or "Dioxane." The isothiocyanate is only slightly soluble in alcohol and practically insoluble in water, while the thiocyanate is slightly soluble in water.

As has been stated, the isothiocyanate is a mustard oil. When used at elevated temperatures or in combination with a solvent, it has a decided irritating effect on human skin. With this exception, the compositions of the invention are not harmful to higher plant life. In fact, they are very beneficial to plant life, for in addition to being deadly to various types of pests and parasites that infest plant lift, they possess the remarkable property of being able to influence, regulate and control the growth of plants, even when present in minute concentration. In other words, the thiocyanate and isothiocyanate of the invention are plant hormones.

It is to be noted that both substances are effective in stimulating the rooting of cuttings and of seedlings. The stimulation of the rooting of seedlings may advantageously be effected by treating the seeds prior to planting. Both substances show considerable activity in inhibiting bud formation, and in prolonging the life of fruit and vegetables in storage.

As has been stated, the thiocyanate and isothiocyanate of the invention may be applied in the form of solutions or emulsions, or as a fine spray with or without a solvent or dispersing agent. They may be used either separately or together as ingredients in insecticidal and fungicidal compositions containing other active or inert ingredients. For instance, the composition in addition to the thiocyanate and/or isothiocyanate may contain a solvent and a wetting agent such as a sulphonated alcohol of the fatty series having from eight to thirty carbon atoms. The composition may contain other substances having fungicidal or insecticidal activity with or without other ingredients having other functions, such as for instance, other plant hormones.

If it is desired to apply the composition in the form of a suspension or dispersion, the thiocyanate or isothiocyanate, either alone or in admixture with other active or inactive ingredients, may be mixed with an oil or fat of either vegetable, animal or mineral origin such as olive oil, castor oil, lanolin, or petroleum oil, etc. The composition may also be applied in dry form in which case it is mixed with a dry powdered filler such as talc, bentonite, clay, kaolin, charcoal, ground carbon or wood flour. Other dry ingredients such as sulphur may also be mixed in.

The thiocyanate or isothiocyanate or a mixture of the two with or without a solvent or dispersing agent may be applied in the form of a very fine spray, particularly in a confined space such as a hot house or storage room.

The compositions may be applied for the eradication of fungi, parasitic diseases due to fungi and plant insects in at least one of the following ways:

1. To the seeds or bulbs before sowing or planting.
2. To the soil before or after planting.
3. To the seedlings when they have barely emerged.
4. To the growing or dormant plants.
5. To the fruit or flowers either on or off the plant.

As has been indicated, a very important application of 1-naphthyl methyl thiocyanate and its isomer is as a growth regulating composition, i. e. as a plant hormone. For this application, the thiocyanate or the iso-compound may be present in a concentration as low as one part in 1,000,000 parts of aqueous or oleaginous vehicle, and in concentrations as high as one part in 1000 parts of alcoholic or oleaginous vehicle. The thiocyanate may be applied as a plant hormone in the form of a powder or dust, in which case the range of concentrations is from one part of thiocyanate in 10,000 parts of composition to one part of thiocyanate in 100 parts of composition.

The thiocyanate and isothiocyanate may be used in compositions containing other substances having some particular effect on plant life such as nutrients, fertilizers, vitamins, or substances which either form vitamins in situ or which facilitate the production of vitamins in the plant. As has been stated, the thiocyante and its isomer may be mixed with other plant hormones. These hormones may either be natural hormones such as auxin $a$, auxin $b$, and hetero-auxin (indoleacetic acid), or any one or more of the synthetic hormones. As examples of suitable synthetic plant hormones may be mentioned phenyl, naphthyl, indole, fluorene, anthracene, naphthoxy and acenaphthene acetic, propionic and butyric acids, naphthyl-hexoic acid and indole-valeric acids, as well as the amides, thioamides, nitriles, lower alkyl esters and alkali metal and ammonium salts of said acids.

The compositions of the present invention may be applied as growth regulating substances to plants in any one or more of the ways known to the art.

The term "plants" as used in the present disclosure and the appended claims is intended to include plants, slips, leaf cuttings, stem cuttings, scions, tubers, roots, seeds, bulbs, seedlings, buds, fruit and flowers, wherever the context permits.

In conclusion, it is to be understood that though I have described my invention with particularity and exactness, the present disclosure is illustrative rather than restrictive. Further, that changes and modifications may be resorted to without sacrificing the advantages of the invention and without departing from the spirit or scope of the invention as defined in the hereunto appended claims.

I claim:

1. The chemical individual selected from the group consisting of naphthyl methyl thiocyanate and naphthyl methyl isothiocyanate.
2. 1-naphthyl methyl thiocyanate.
3. 1-naphthyl methyl isothiocyanate.

FRANKLIN D. JONES.